(12) United States Patent
Kondameedi et al.

(10) Patent No.: US 11,975,409 B2
(45) Date of Patent: May 7, 2024

(54) CUTTING TOOLS HAVING MICROSTRUCTURED AND NANOSTRUCTURED REFRACTORY SURFACES

(71) Applicant: KENNAMETAL INC., Latrobe, PA (US)

(72) Inventors: Naveen Kondameedi, Whitehouse, OH (US); Fabian Rosenberger, Latrobe, PA (US); Christoph Gey, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 163 days.

(21) Appl. No.: 17/592,647

(22) Filed: Feb. 4, 2022

(65) Prior Publication Data

US 2022/0152747 A1 May 19, 2022

Related U.S. Application Data

(62) Division of application No. 14/694,791, filed on Apr. 23, 2015, now Pat. No. 11,358,241.

(51) Int. Cl.
*B23K 26/402* (2014.01)
*B23B 27/14* (2006.01)
(Continued)

(52) U.S. Cl.
CPC ......... *B23K 26/402* (2013.01); *B23B 27/145* (2013.01); *B23K 26/0624* (2015.10);
(Continued)

(58) Field of Classification Search
CPC .. B23K 26/402; B23K 26/36; B23K 26/0624; B23K 26/362; B23B 27/145
See application file for complete search history.

(56) References Cited

U.S. PATENT DOCUMENTS

| 5,178,645 A | 1/1993 | Nakamura et al. |
| 5,752,573 A | 5/1998 | Scott et al. |
(Continued)

FOREIGN PATENT DOCUMENTS

| CN | 102294508 A | 12/2011 |
| CN | 102753290 A | 10/2012 |
(Continued)

OTHER PUBLICATIONS

Feb. 13, 2023 Foreign Office Action German Application No. DE102016107623.6, 16 Pages.
(Continued)

*Primary Examiner* — Pegah Parvini
(74) *Attorney, Agent, or Firm* — Larry R. Meenan

(57) ABSTRACT

In one aspect, cutting tools are provided comprising radiation ablation regions defining at least one of refractory surface microstructures and/or nanostructures. For example, a cutting tool described herein comprises at least one cutting edge formed by intersection of a flank face and a rake face, the flank face formed of a refractory material comprising radiation ablation regions defining at least one of surface microstructures and surface nanostructures, wherein surface pore structure of the refractory material is not occluded by the surface microstructures and surface nanostructures.

11 Claims, 9 Drawing Sheets

(51) Int. Cl.
   *B23K 26/0622*  (2014.01)
   *B23K 26/38*    (2014.01)
   *B23K 101/20*   (2006.01)
   *B23K 103/00*   (2006.01)

(52) U.S. Cl.
   CPC ........ *B23K 26/38* (2013.01); *B23B 2200/081* (2013.01); *B23B 2200/085* (2013.01); *B23B 2200/086* (2013.01); *B23B 2200/121* (2013.01); *B23B 2200/125* (2013.01); *B23B 2200/128* (2013.01); *B23B 2226/125* (2013.01); *B23B 2226/18* (2013.01); *B23B 2226/31* (2013.01); *B23B 2226/315* (2013.01); *B23B 2228/04* (2013.01); *B23B 2228/44* (2013.01); *B23B 2260/092* (2013.01); *B23K 2101/20* (2018.08); *B23K 2103/50* (2018.08); *B23K 2103/52* (2018.08)

(56) References Cited

U.S. PATENT DOCUMENTS

| | | | |
|---|---|---|---|
| 7,884,446 | B2 | 2/2011 | Mazur |
| 8,325,339 | B2 | 12/2012 | Ebstein |
| 8,709,217 | B2 | 4/2014 | Krishna |
| 2006/0194078 | A1 | 8/2006 | Heinrich et al. |
| 2008/0075543 | A1 | 3/2008 | Zhu |
| 2009/0260895 | A1 | 10/2009 | Vail et al. |
| 2011/0097162 | A1* | 4/2011 | Gey ............ B23K 26/38 219/121.72 |
| 2012/0328905 | A1 | 12/2012 | Guo |
| 2013/0138103 | A1 | 5/2013 | Cheng |
| 2014/0072720 | A1 | 3/2014 | Watkins |
| 2014/0188222 | A1 | 7/2014 | Gefen |

FOREIGN PATENT DOCUMENTS

| | | |
|---|---|---|
| CN | 102917822 A | 2/2013 |
| CN | 103826781 A | 5/2014 |
| DE | 102010011508 A1 | 9/2011 |
| DE | 102011053740 A1 | 3/2013 |
| JP | 2007216327 A | 8/2007 |
| WO | WO2007104065 A1 | 9/2007 |

OTHER PUBLICATIONS

Zengqiang Li et al., "Ultrashort Pulsed Laser Micromachining of Polycrystalline Diamond", Trans Tech Publications, 2012, doi: 10.4028/www.scientific.net/AMR.497.220, 6 pages.

Yongsheng Su et al., "Experimental study of fiber laser surface texturing of polycrystalline diamond tools", ScienceDirect, Int. Journal of Refractory Metals and Hard Materials, vol. 45, 2014, pp. 117-124.

Rhander Viana et al., "Laser texturing of substrate of coated tools—Performance during machining and in adhesion tests", ScienceDirect, Surface & Coatings Technology, Elsevier, 2015, vol. 276, pp. 485-501.

Qiumei Bian et al., "Femotsecond laser ablation of indium tin-oxide narrow grooves for thin film solar cells", ScienceDirect, Optics & Laser Technology, Elsevier, 2012, http://dx.doi.org/10.1016/j.optlastec.2012.06.018, pp. 1-7.

Keming Du et al., "Thin layer ablation with lasers of different beam profiles—Energy efficiency and over filling factor", SPIE Proc. Photonics West 2009, San Jose, vol. 7202, 9 pages.

K. Chen et al., "Rapid communication—Generation of submicron surface gratings on LiNbO3 by ultrashort UV laser pulses", Applied Physics A Materials Science & Processing, 1997, 2 pages.

J. Bonse et al., "Ultrashort-pulse laser ablation of indium phosphide in air", Applied Physics A Materials Science & Processing, vol. 72, 2001, pp. 89-94.

Claus Dold et al., "High Performance Cutting—Comparison of ground and laser machined polycrystalline diamond (PCD) tools in cutting carbon fiber reinforced plastics (CFRP) for aircraft structures.", ScienceDirect, Elsevier, Procedia CIRP (2012), pp. 178-183.

C.H. Crouch et al., "Comparison of structure and properties of femtosecond and nanosecond laser-structured silicon", Applied Physics Letters, Mar. 15, 2004, vol. 84, No. 11, pp. 1850-1852.

Christian Brecher et al., "Laser Roughing of PCD", ScienceDirect, Elsevier, 2014, Physics Procedia vol. 56, pp. 1107-1114.

Feb. 10, 2022 Notice of Allowance US App. No. 20160311030A1.
Nov. 15, 2021 Office Action (non-US) DE App. No. 102016107623A1.
Oct. 13, 2021 Final Office Action (US Only) US App. No. 20160311030A1.
Apr. 21, 2021 Office action (3 months) (US Only) US App. No. 20160311030A1.
Jun. 19, 2020 Notice of Allowance CN App. No. 106064245A.
May 5, 2019 Office Action (non-US) CN App. No. 106064245A.
Dec. 14, 2018 Final Office Action (US Only) US App. No. 20160311030A1.
Sep. 4, 2018 Office Action (non-US) CN App. No. 106064245A.
May 17, 2018 Office action (3 months) (US Only) US App. No. 20160311030A1.
Jan. 18, 2018 Advisory Action (PTOL-303) 1 US App. No. 20160311030A1.
Oct. 17, 2017 Final Office Action US App. No. 20160311030A1.
Apr. 21, 2017 Office action (3 months) 1 US App. No. 20160311030A1.
S. Aggarwal et al., "Spontaneous Ordering of Oxide Nanostructures", Science, www.sciencemag.org, vol. 287, Mar. 24, 2000, pp. 2235-2237.

Toshiaki Kondo et al., "Multiphoton fabrication of periodic structures by multibeam interference of femtosecond pulses", Applied Physics Letters, vol. 82, No. 17, Apr. 28, 2003, pp. 2758-2760.

N. Yasumaru et al., "Glassy carbon layer formed in diamond-like carbon films with femtosecond laser pulses", Applied Physics A Materials Science & Processing, vol. 29, 2004, pp. 425-427.

A.Y. Vorobyev et al., "Femtosecond laser nanostructuring of metals", Optics Express, Mar. 20, 2006, vol. 14, No. 6, pp. 2164-2169.

Gabriel Dumitru et al., "Femtosecond laser ablation of diamond-like carbon films", ScienceDirect, Elsevier, 2003, pp. 226-233.

G. Dumitru et al., "Femtosecond ablation of ultrahard materials", Applied Physics A Materials Science & Processing, 2002, vol. 74, pp. 729-739.

J. Bonse et al., "Chemical, morphological and accumulation phenomena in ultrashort-pulse laser ablation of TiN in air", Applied Physics A Materials Science & Processing, 2000, vol. 71, pp. 657-665.

Gabriel Dumitru et al., "Ablation of carbide materials with femtosecond pulses", Sciencedirect, Elsevier, Applied Surface Science, 2003, vol. 205, pp. 80-85.

B Tan et al., "A femtosecond laser-induced periodical surface structure on crystalline silicon", Journal of Micromechanics and Microengineering, 2006, vol. 16, pp. 1080-1085.

Dec. 8, 2022 Foreign Office Action German Application No. DE102016107623.6, 18 pages.

Blunt, et al., Advanced Techniques for Assessment Surface Topography, 1st Ed.

Bäuerle, Dieter: Laser processing and chemistry, 4th ed., Heidelberg Springer, 2011, 851 pages.
Bäuerle, Dieter: Laser processing and chemistry. 4th ed., Heidelberg: Springer, 2011, pp. 199-235.
Bäuerle, Dieter: Laser processing and chemistry. 4th ed., Heidelberg: Springer, 2011, pp. 237-278.
Bäuerle, Dieter: Laser processing and chemistry. 4th ed., Heidelberg: Springer, 2011, pp. 279-313.
Bäuerle, Dieter: Laser processing and chemistry. 4th ed., Heidelberg: Springer, 2011, pp. 3-12.
Bäuerle, Dieter: Laser processing and chemistry. 4th ed., Heidelberg: Springer, 2011, pp. 623-677.
Bäuerle, Dieter: Laser processing and chemistry. 4th ed., Heidelberg: Springer, 2011, pp. 85-107.
ISBN 9781903996116.
ISO 11562.

(56) References Cited

OTHER PUBLICATIONS

Lendner, Florian: Presentation Technology Day Nov. 22, 2012 Laser Zentrum Hannover (LZH). In: GFH GmbH. Deggendorf: Drilling and micro-cutting with helical drilling optics. 2012. 32 pages.
Microfine cuts with ultrashort pulse lasers. In: Microproduction, 2012, 05, pp. 29 to 31.

* cited by examiner

CUTTING TOOLS HAVING MICROSTRUCTURED AND NANOSTRUCTURED REFRACTORY SURFACES

RELATED APPLICATION DATA

The present application is a divisional application of U.S. patent application Ser. No. 14/694,791 filed Apr. 23, 2015.

FIELD

The present invention relates to cutting tools employing refractory materials and, in particular, to cutting tools having refractory surfaces microstructured and/or nanostructured by exposure to ablative laser radiation.

BACKGROUND

PCD is an extremely hard and abrasion resistant material rendering it suitable for a variety of wear applications. PCD is generally produced by application of high temperatures and pressures to graphite positioned in large special-purpose presses. Application of such temperatures and pressures converts the hexagonal structure of graphite to the cubic structure of diamond. Metallic solvent and/or catalyst can be employed to reduce temperatures and pressures required for graphite conversion into diamond. For example, cobalt, nickel and/or iron can be included in the synthetic process to ease temperatures and pressures. Alternatively, it is possible to produce PCD by sintering numerous individual crystals of diamond to provide a large polycrystalline mass. In commercial processes, the rate of polycrystalline formation is often enhanced by addition of a metal or ceramic secondary phase. Use of such metallic species has disadvantages, as the resulting product comprises diamond grains with metallic binder largely located at grain boundaries.

Metallic binder phase is generally present in an amount of 5-10 vol. % leading to compromises in the chemical and thermal stabilities of the PCD composition. Metallic binder, for example, can enhance graphitization and induce thermal stresses at temperatures in excess of 700° C. due to large disparities in coefficients of thermal expansion between the metallic binder and diamond. Such thermal constraints can restrict the library of refractory materials that may be successfully applied to PCD substrates of cutting tools. Further, PCD and other ultrahard tool materials, including polycrystalline cubic boron nitride (PcBN), are difficult and time consuming to process into cutting tools. Current grinding processes, for example, often result in grain pull-out and/or other surface irregularities due to diamond on diamond contact. Further, electrical discharge machining (EDM) can preferentially wear the binder phase, weakening the integrity of the polycrystalline material. In view of these processing disadvantages, the development of techniques yielding new and desirable refractory surface architectures is called for.

SUMMARY

In one aspect, cutting tools are provided comprising radiation ablation regions defining refractory surface microstructures and/or nanostructures. For example, a cutting tool described herein comprises at least one cutting edge formed by intersection of a flank face and a rake face, the flank face formed of a refractory material comprising radiation ablation regions defining at least one of surface microstructures and surface nanostructures, wherein surface pore structure of the refractory material is not occluded by the surface microstructures and/or surface nanostructures. In some embodiments, the surface microstructures and surface nanostructures are of substantially uniform height within an ablation region. Further, the surface microstructures, in some embodiments, are nodules or ridges.

In another embodiment, a cutting tool comprises at least one cutting edge formed by intersection of a rake face and a flank face, the rake face formed of a refractory material comprising radiation ablation regions defining at least one of surface microstructures and surface nanostructures, wherein surface pore structure of the refractory material is not occluded by the surface microstructures and surface nanostructures. In some embodiments, the radiation ablation regions are located on one or more surface structures of the rake face, such as a chip breaker structure.

In a further aspect, methods of making cutting tools are described herein. A method of making a cutting tool comprises providing a cutting insert comprising a rake face and a body formed of a refractory material and cutting through the rake face and body with a laser beam to provide a flank face forming a cutting edge with the rake face. The flank face comprises radiation ablation regions defining at least one of surface microstructures and surface nanostructures, wherein pore structure of the refractory material is not occluded by the surface microstructures and surface nanostructures.

These and other embodiments are further described in the following detailed description.

DETAILED DESCRIPTION

Figure 1:
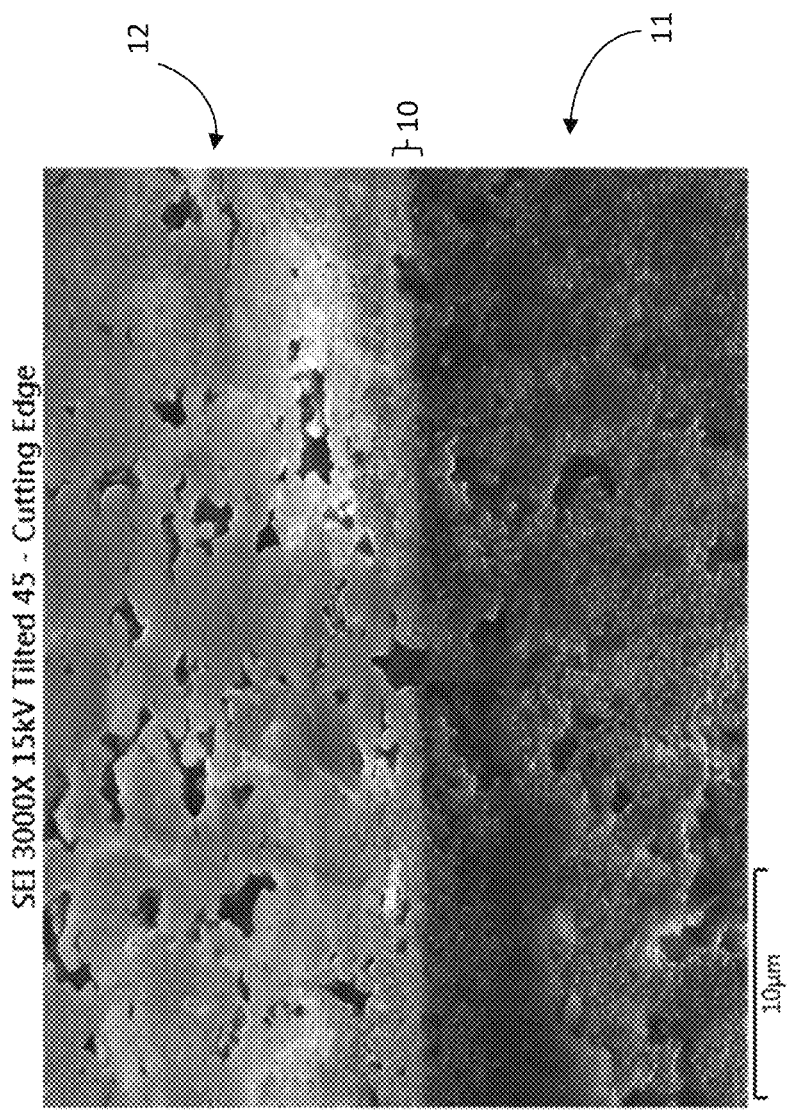
FIG. 1 is a scanning electron microscopy (SEM) image at 3000× of a cutting edge of a PCD cutting tool according to one embodiment described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, cutting tools are provided comprising radiation ablation regions defining refractory surface microstructures and/or nanostructures. A cutting tool described herein, in some embodiments, comprises at least one cutting edge formed by intersection of a flank face and a rake face, the flank face formed of a refractory material comprising radiation ablation regions defining at least one of surface microstructures and surface nanostructures, wherein surface pore structure of the refractory material is not occluded by the surface microstructures and surface nanostructures.

The refractory material of the flank face can comprise any refractory material interacting with laser radiation described herein to provide radiation ablation regions defining at least one of surface microstructures and surface nanostructures. The flank face refractory material, for example, can be single crystalline such as single crystal diamond. Alternatively, the flank face refractory material is polycrystalline, including polycrystalline diamond (PCD). Polycrystalline diamond can generally exhibit an average grain size of 0.5 μm to 50 μm. Further, the polycrystalline diamond can have a bimodal or multimodal grain size distribution. Additional refractory polycrystalline materials of the flank face can include cemented carbide, chemical vapor deposition (CVD) diamond, polycrystalline cubic boron nitride (PcBN) and polycrystalline ceramics.

Cemented carbide forming the flank face, in some embodiments, comprises tungsten carbide (WC) in an amount of at least 80 weight percent or at least 85 weight percent. The tungsten carbide can have an average particle size of 0.5 μm to 30 μm. Additionally, metallic binder of cemented carbide can comprise cobalt or cobalt alloy. Cobalt, for example, can be present in the cemented carbide composition in an amount ranging from 1 weight percent to 20 weight percent. Cemented carbide of the flank face can also comprise one or more additives such as, for example, one or more of the following elements and/or their compounds: titanium, niobium, vanadium, tantalum, chromium, zirconium, ruthenium, rhenium, molybdenum and/or hafnium. In some embodiments, titanium, niobium, vanadium, tantalum, chromium, zirconium and/or hafnium form solid solution carbides with WC. Additionally, cemented carbide can comprise nitrogen.

PcBN of the flank face can include at least 45 weight percent PcBN. In some embodiments, PcBN is present in an amount selected from Table I.

TABLE I

| Weight Percent PcBN |
|---|
| ≥45 |
| ≥50 |
| ≥60 |
| ≥70 |
| ≥80 |
| ≥85 |
| ≥90 |
| 45-95 |
| 86-97 |
| 90-97 |
| 92-95 |

Further, PcBN of the flank face can also include ceramic or metallic binder. Suitable ceramic binders for PcBN comprise nitrides, carbonitrides, carbides and/or borides of titanium, tungsten, cobalt or aluminum. In some embodiments, for example, PcBN comprises a binder of AlN, $AlB_2$ or mixtures thereof.

Compositional determination of PcBN forming the flank face can be conducted by X-ray diffraction (XRD). For compositional phase analysis of a PcBN substrate described herein, a PANalytical X'pert MRD diffraction system fitted with a Eulerean cradle and microfocus optics for PcBN compacts and tips or a PANalytical X'pert MPD fitted with programmable optics for analysis of a monolithic solid piece of PcBN can be used.

Both x-ray diffraction systems are configured with focusing beam optics and fitted with a copper x-ray tube and operating parameters of 45 KV and 40 MA. For analysis of the monolithic solid piece, the PANalytical MRD is fitted with programmable divergence slit and programmable anti-scatter slit. The x-ray beam width is controlled by an appropriate mask size and x-ray beam length is fixed at 2 mm using the programmable optics. The PANalytical MPD is fitted with a linear strip solid state x-ray detector and nickel beta filter.

The PANalytical X'pert MRD system is configured with microfocus monocapillary optics of either 100μ or 500μ focal spot depending on size of PcBN flank face. The PANalytical MRD is fitted with a linear strip solid state x-ray detector and nickel beta filter.

Analysis scan range, counting times, and scan rate are selected to provide optimal data for Rietveld analysis. A background profile is fitted and peak search is performed on the PcBN substrate diffraction data to identify all peak positions and peak intensities. The peak position and intensity data is used to identify the crystal phase composition of the PcBN flank face using any of the commercially available crystal phase databases.

Crystal structure data is input for each of the crystalline phases present in the substrate. Typical Rietveld refinement parameters settings are:

Sample Geometry: Flat Plate
Linear Absorption Coefficient: Calculated from average specimen composition
Weighting Scheme: Against Jobs
Profile Function: Pseudo-Voigt
Profile Base Width: Chosen per specimen
Least Squares Type: Newton-Raphson
Polarization Coefficient: 1.0

The Rietveld refinement typically includes:

Specimen Displacement: shift of specimen from x-ray alignment
Background profile selected to best describe the background profile of the diffraction data
Scale Function: scale function of each phase
B overall: displacement parameter applied to all atoms in phase
Cell parameters: a, b, c and alpha, beta, and gamma
W parameter: describes peak FWHM
Any additional parameter to achieve an acceptable weighted R-value.

In further embodiments, polycrystalline ceramics forming the rake face can comprise one or more metallic elements selected from the group consisting of aluminum and metallic elements of Groups IVB, VB and VIB of the Periodic Table and one or more non-metallic elements of Groups IIIA, IVA, VA and VIA of the Periodic Table. For example, polycrystalline ceramic can be selected from the group consisting of alumina, titanium nitride, titanium carbonitride, titanium oxycarbonitride, titanium carbide, zirconium nitride, zirconium carbonitride, hafnium nitride and hafnium carbonitride.

The refractory material of the flank face, in some embodiments, is graphite. Additionally, the refractory material of the flank face can include a hybrid material comprising a fraction exhibiting $sp^3$ hybridization and a fraction exhibiting $sp^2$ hybridization, such as various grades of diamond-like carbon (DLC).

Surface microstructures and surface nanostructures of radiation ablation regions on the flank face can exhibit various morphologies based on compositional identity of the rake face and specifications of the laser radiation applied in forming the rake face, as detailed further below. In some embodiments, surface microstructures and surface nanostructures are nodules. In other embodiments, surface microstructures and surface nanostructures are ridges. Surface microstructures or nanostructures can exhibit substantially uniform height in a radiation ablation region. In some embodiments, surface microstructures or surface nanostructures exhibit substantially uniform height across adjacent radiation ablation regions of the flank face. Further, surface microstructures or surface nanostructures can have substantially uniform spacing within a radiation ablation region. Additionally, surface microstructures or nanostructures can display substantially uniform spacing across adjacent radiation ablation regions of the flank face. The surface microstructures and/or nanostructures, in some embodiments, can provide the flank face surface roughness (Ra) of 0.025 μm to 0.7 μm. Surface roughness of radiation ablation regions of the flank face is determined according to ISO 4287.

Interaction of the flank face refractory material with laser radiation applied by apparatus described below to form surface microstructures and/or nanostructures of radiation ablation regions does not result in redistribution and/or redeposition of the refractory material. Surface pore structure of the flank face refractory material, for example, is not occluded by the surface microstructures and surface nanostructures. Moreover, in some embodiments, refractory material is uniformly removed from the rake face to form the microstructures and/or nanostructures. In such embodiments, components of the refractory material are not preferentially ablated by exposure to the laser radiation. For example, metallic binder of PCD or cemented carbide is not preferentially removed or etched upon exposure to laser radiation leaving a skeletal structure of PCD grains or WC grains. Similarly, cermanic binder of PcBN is not preferentially removed. Uniform or substantially uniform removal of refractory material components to form the surface microstructures and/or surface nanostructures can inhibit or mitigate grain pull-out and other mechanisms leading to cutting edge degradation of the tooling.

The cutting edge formed by intersection of the flank and rake faces can have any desired radius not inconsistent with the objectives of the present invention. In some embodiments, the cutting edge has a radius of 4 μm to 25 μm. In other embodiments, the cutting edge has a radius up to 60 μm or less than 5 μm. The cutting edge can be honed or further processed to any desired shape or architecture including T-lands, Viper or arbitrary edge shapes such as wavy structures. Further processing of the cutting edge can be administered with laser radiation applied by apparatus detailed herein resulting in the formation of radiation ablation regions on the rake face as described below.

Figure 2:
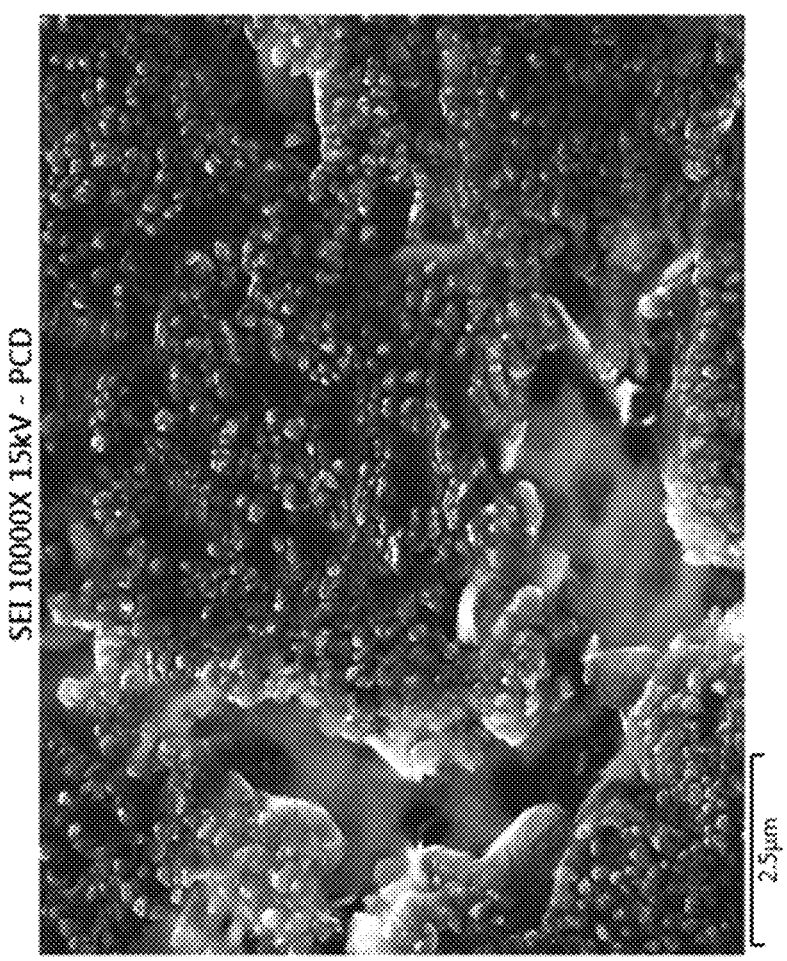
FIG. 2 is an SEM image of a section of the flank face of FIG. 1 taken at a magnification of 10000×.
Figure 3:
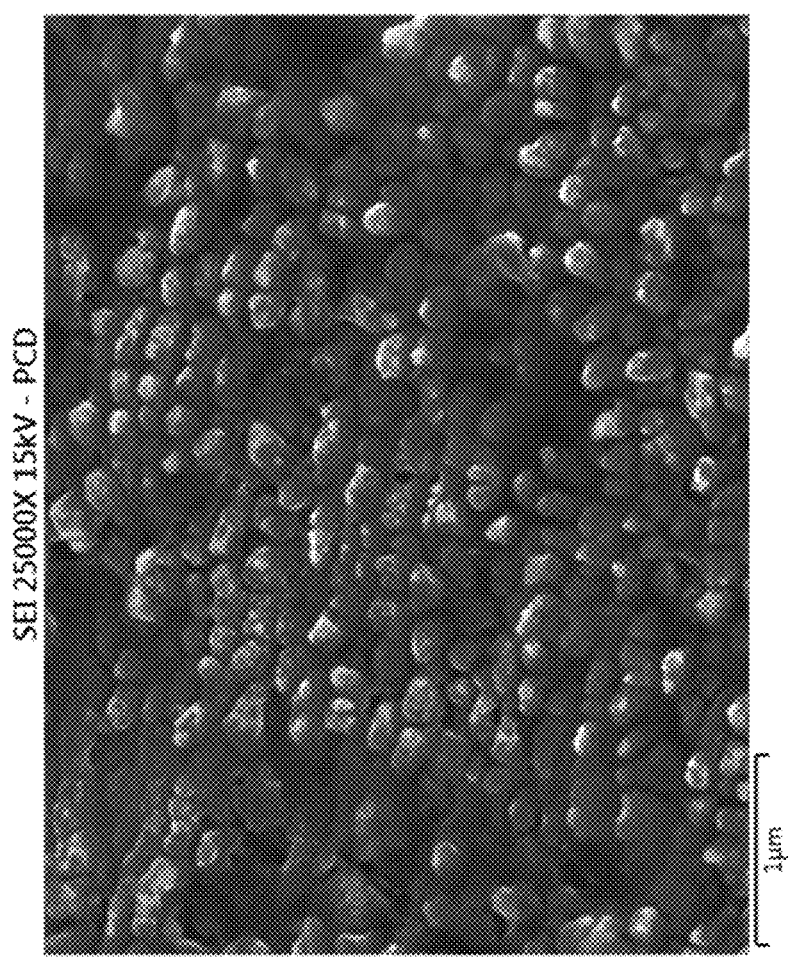
FIG. 3 is an SEM of a section of the flank face of FIG. 1 taken at a magnification of 25000×.

FIGS. 1-6 illustrate the foregoing structural features of a cutting tool according to one embodiment described herein. FIG. 1 is an SEM image taken at 3000× of a cutting edge (10) formed by intersection of a flank face(11) and a rake face (12). The flank (11) and rake (12) faces are formed of PCD. The flank face (11) comprises radiation ablation regions along the entire flank surface defining surface microstructures and nanostructures, while the rake face (12) is free of radiation ablation regions at a distance of at least 1 μm from the cutting edge (10). As illustrated by FIG. 1, the PCD material is not redistributed or redeposited and surface pore structure of the flank face (11) is not occluded by the surface microstructures and surface nanostructures. FIG. 2 is an SEM image of a section of the flank face (11) of FIG. 1 taken at a magnification of 10000×. The higher magnification of FIG. 2 resolves the nodule morphology of the surface nanostructures and the absence of pore occlusion by the surface nanostructures. FIG. 3 is an SEM of a section of the flank face of FIG. 2 taken at a magnification of 25000×. The higher magnification of FIG. 3 characterizes the substantially uniform height and spacing of the nanoscale nodules.

Figure 4:
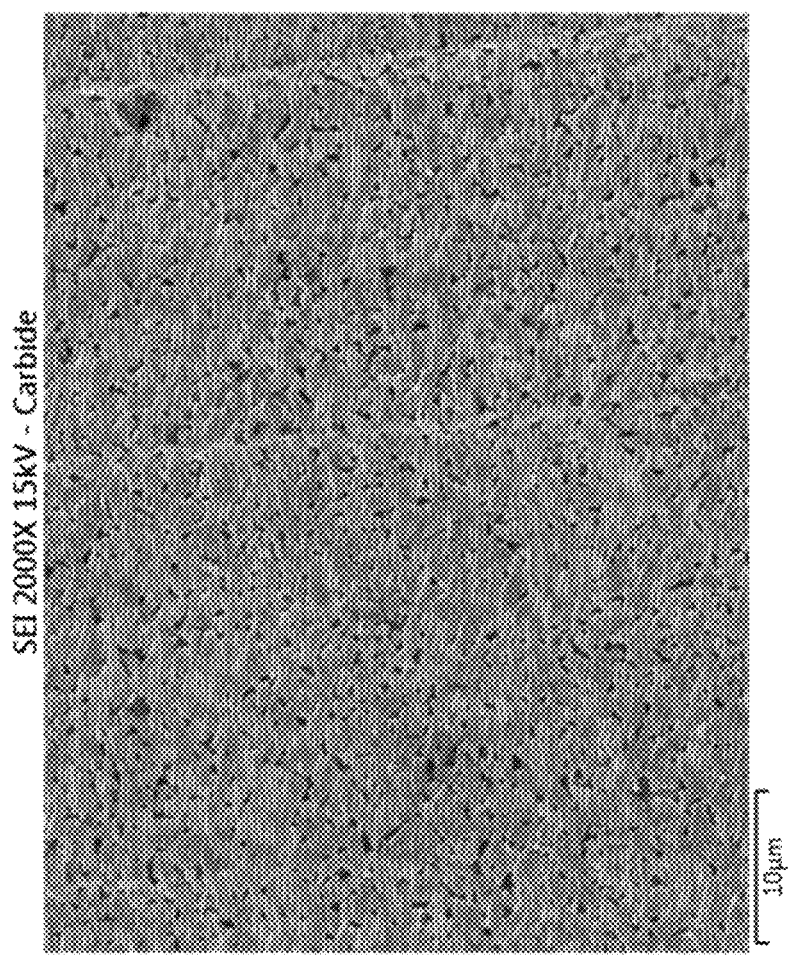
FIG. 4 is an SEM image at 2000× of a flank face of a cemented tungsten carbide cutting tool substrate according to one embodiment described herein.
Figure 5:
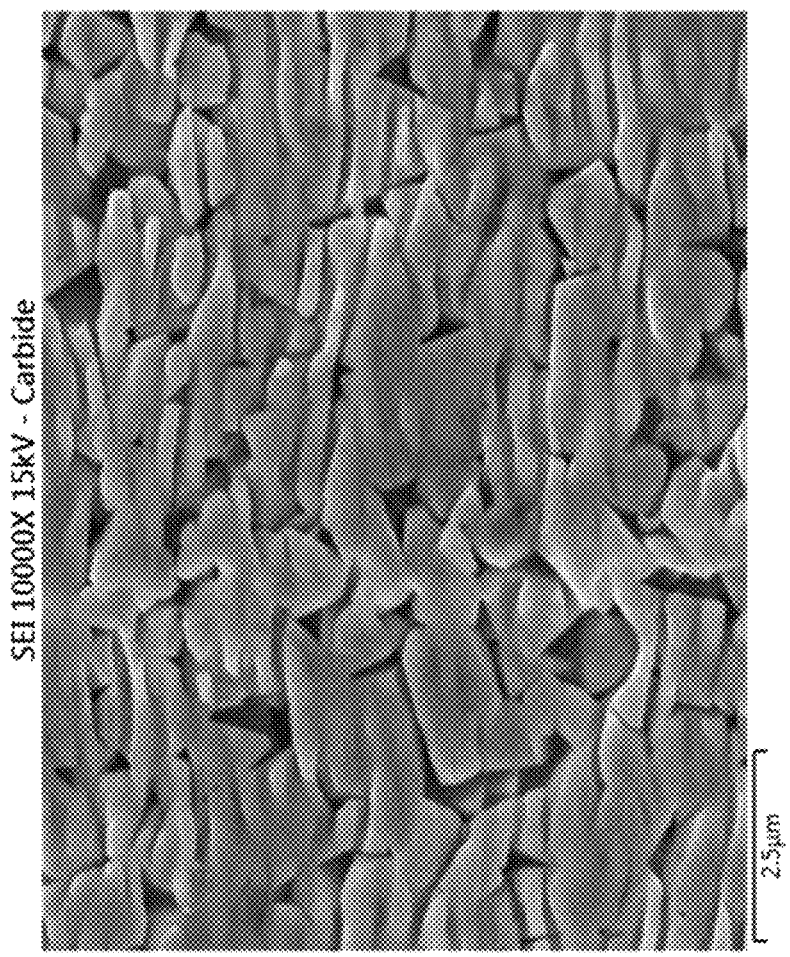
FIG. 5 is an SEM image of a section of the flank face of FIG. 4 taken at a magnification of 10000×.
Figure 6:
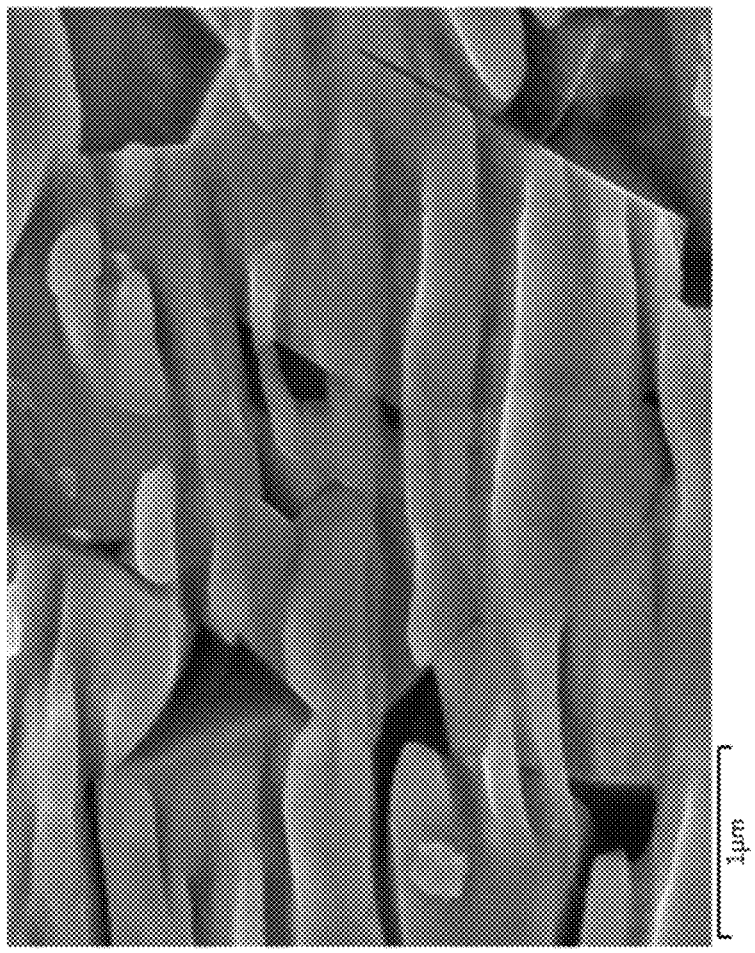
FIG. 6 is an SEM image of a section of the flank face of FIG. 4 taken at a magnification of 25000×.
Figure 7:
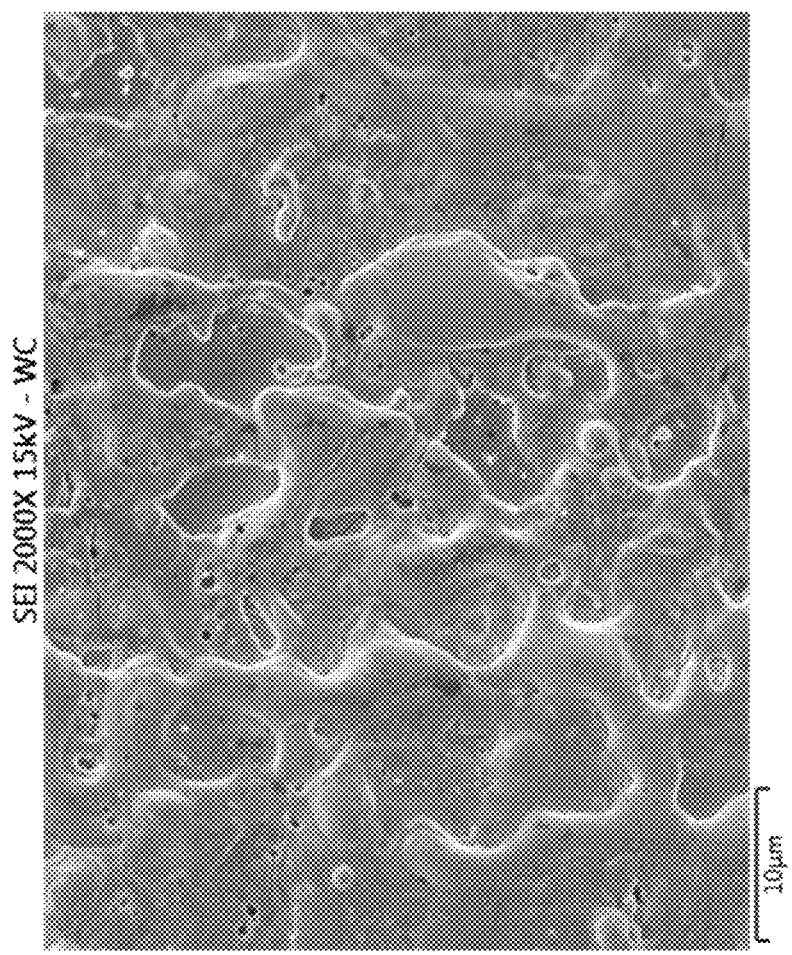
FIG. 7 is an SEM image of a section of a cemented carbide flank face processed with laser radiation having nanosecond pulse duration.

FIGS. 4-6 also illustrate the cutting tool structural features described above. FIGS. 4-6 correspond to flank surfaces of the cemented WC substrate to which the PCD cutting architecture of FIGS. 1-3 is sintered. FIG. 4 is an SEM image at 2000× of a flank face section of the cemented WC substrate. As provided by FIG. 4, the surface microstructures and nanostructures exhibit substantially uniform morphology and height across adjacent radiation ablation regions of the flank face. FIG. 5 is an SEM image of a section of the flank face of FIG. 4 taken at a magnification of 10000×. The higher magnification of FIG. 4 establishes the ridge-like morphology of the surface microstructures and nanostructures and the absence of material redistribution and pore occlusion. Moreover, FIG. 6 is an SEM image of a section of the flank face of FIG. 4 taken at a magnification of 25000×. The high magnification of FIG. 6 illustrates the substantially uniform height and spacing of the surface microstructures and nanostructures.

In contrast to the radiation ablation regions of FIGS. 1-6, FIG. 7 illustrates a flank face section of a cemented WC cutting tool processed with a laser beam having pulse duration on the nanosecond time scale where the cemented WC material is melted and redistributed over the surface. Due to this melting and redistribution of material, surface pore structure of the cemented WC is occluded or destroyed. Moreover, no discernable microstructure or nanostructure periodicity or ordering is present.

Methods of making cutting tools having the structural features illustrated in FIGS. 1-6 and described above are also provided herein. A method of making a cutting tool, for example, comprises providing a cutting insert including a rake face and a body formed of a refractory material and cutting through the rake face and body with a laser beam to provide a flank face forming a cutting edge with the rake face. The flank face comprises radiation ablation regions defining at least one of surface microstructures and surface nanostructures, wherein pore structure of the refractory material is not occluded by the surface microstructures and surface nanostructures.

Laser radiation and associated apparatus of appropriate specification are employed to cut the rake face and body formed of the refractory material yielding the flank face comprising radiation ablation regions defining the surface microstructures and/or surface nanostructures, where the surface microstructures and nanostructures do not occlude pore structure of the refractory material. Specific laser beam parameters can be dependent on the identity of the refractory material to be cut, such as PCD, cemented WC or PcBN. In some embodiments, ultrashort pulsed lasers (e.g. femtosecond) are used having the capacity to transfer energy into the refractory material in extremely limited time durations, generally less than the thermal excitation time of lattice-electron interactions. In such embodiments, thermal diffusion is limited resulting in negligible heat-affected zone, and the thermal energy is concentrated around the focal region. Further, peak intensity can reach or exceed GW/cm² enabling ablation of refractory material grains and associated metallic or ceramic binder. General laser beam specifications for methods described herein are provided in Table II.

TABLE II

Laser Beam Specifications

| Wavelength(s) | UV-near IR |
|---|---|
| Medial Power | 0.1-100 W |
| Pulse Width | <100 picosecond (ps) |
| Pulse Energy | >0.05 μJ |
| Focal Diameter | 10-150 μm |

Additionally, the laser beam can be rotated during the cutting process. Laser trepanning apparatus for example, can be employed in the cutting operation. Such systems can be designed and implemented to enable the adjustment of circular beam displacement and integration during rotation of the optics. Optic rotation speed for the present cutting applications can exceed 10,000 rpm for smaller pulse overlap. Further, the laser beam can exhibit a rotationally symmetric weight distribution. Suitable laser trepanning apparatus for administering methods described herein are commercially available from GFH, GmbH of Deggendorf, Germany under the GL.trepan trade designation.

In a further aspect, cutting tools comprising radiation ablation regions on the rake face are described herein. For example, a cutting tool comprises at least one cutting edge formed by intersection of a rake face and a flank face, the rake face formed of a refractory material comprising radiation ablation regions defining at least one of surface microstructures and surface nanostructures, wherein surface pore structure of the refractory material is not occluded by the surface microstructures and surface nanostructures. Surface microstructures and surface nanostructures of the rake face can have the same morphologies and architectures described above and illustrated in FIGS. 1-6. Surface microstructures and nanostructures of the rake face, for example, can be nodules or ridges and exhibit substantially uniform height and/or spacing within a radiation ablation region or between adjacent radiation ablation regions. Further, refractory material of the rake face can comprise any refractory material described herein for the flank face including PCD, polycrystalline CVD diamond, PcBN, cemented carbide, polycrystalline ceramics, single crystal diamond, graphite or DLC having properties detailed above.

In some embodiments, radiation ablation regions are located on one or more surface structures of the rake face. Radiation ablation regions, for example, can be located on one or more chip breaker structures of the rake face. In some embodiments, radiation ablation regions are located on sidewalls and/or bottom surfaces of a chip breaker structure. Radiation ablation regions of the rake face can also be associated with a cutting edge architecture including T-lands, Viper or arbitrary edge shapes. Radiation ablation regions can be imparted to rake face surfaces by exposure to laser radiation having characteristics discussed above and generally characterized in Table II. Further, radiation ablation regions of the rake face can exhibit surface roughness (Sa) of 0.002 μm to 4 μm. Sa of a rake face radiation ablation region can be determined according to the procedures set forth in Blunt et al., Advanced Techniques for Assessment Surface Topography, 1$^{st}$ Ed., ISBN 9781903996116 and ISO 11562.

These and other embodiments are further illustrated in the following non-limiting examples.

EXAMPLE 1

PCD Cutting Tool

A PCD cutting tool including a flank face comprising radiation ablation regions defining surface microstructures and nanostructures was fabricated as follows. A PCD cutting insert blank was provided. The PCD cutting insert blank comprised a PCD layer sintered to a cemented carbide substrate in a high temperature, high pressure (HPHT) press. The PCD layer exhibited an average grain size of 10 μm and thickness of 1.6 mm, while the cemented carbide substrate comprised cobalt binder and WC grains of size 1-10 μm. The rake face and body of the PCD cutting insert blank were cut with a laser beam having the specification listed in Table III. The laser beam was produced by GL.trepan laser drilling apparatus from GFH GmbH.

TABLE III

Laser Beam Specifications

| Wavelength | 1030 nm |
|---|---|
| Medial Power | 50 W |
| Pulse Width | <1 ps |
| Pulse Energy | 0.25 μJ |
| Focusing Optic | 90 mm |
| Focal Diameter | Variable |
| Repetition Rate | 200 kHz |
| Scan speed | 2 mm/min |

Figure 8:
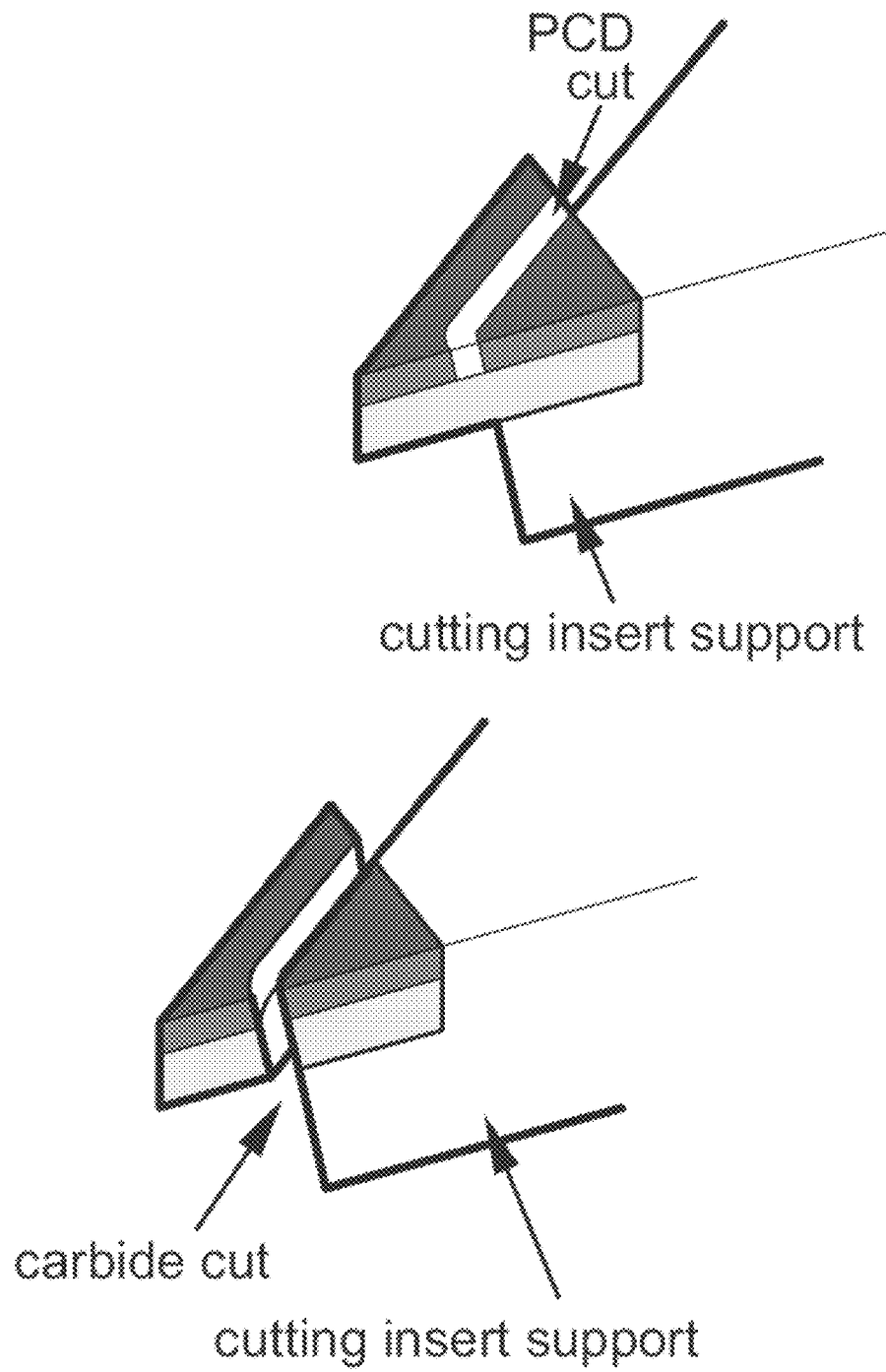
FIG. 8 is a schematic of laser cutting the rake face and body of a PCD cutting insert blank to provide a flank face having radiation ablation regions according to some embodiments described herein.

FIG. 8 is a schematic of laser cutting the rake face and body of the PCD cutting insert blank to provide a flank face having radiation ablation regions described herein. As illustrated in FIG. 8, the PCD layer is cut with the laser drilling apparatus followed by cutting of the cemented carbide substrate with the laser apparatus.

Cutting of the rake face and the PCD body yielded a flank face having radiation ablation regions defining the surface microstructures and surface nanostructures illustrated in FIGS. 1-3. Importantly, the flank face was not further processed subsequent to cutting by the GL.trepan laser drilling apparatus to impart the radiation ablation regions. Moreover, cutting of the underlying WC—Co substrate yielded radiation ablation regions defining surface microstructures and nanostructures illustrated in FIGS. 4-6. The WC—Co surface microstructures and nanostructures exhibited a ridge-like morphology in contrast to the nodule morphology of the PCD nanostructures.

EXAMPLE 2

PCD Cutting Tool

A PCD cutting tool cutting tool having a rake face including a chip breaker structure comprising radiation ablation regions defining at least one of surface microstructures and surface nanostructures was fabricated as follows. A PCD cutting insert blank was provided. The PCD cutting insert blank comprised a PCD layer sintered to a cemented carbide substrate in a HPHT press. The PCD layer exhibited an average grain size of 10 μm and thickness of 0.5 mm. The chip breaker structure was machined on the rake face surface with a laser beam having the specification listed in Table IV. The laser beam was produced by GL.scan laser drilling apparatus from GFH GmbH.

TABLE IV

Laser Beam Specifications

| Wavelength | 1030 nm |
|---|---|
| Medial Power | 20-50 W |
| Pulse Width | <1 ps |
| Pulse Energy | 0.25 μJ |
| Focusing Optic | 163 mm |
| Focal Diameter | Variable |
| Repetition Rate | 200 kHz |
| Scan speed | Variable |

Figure 9:
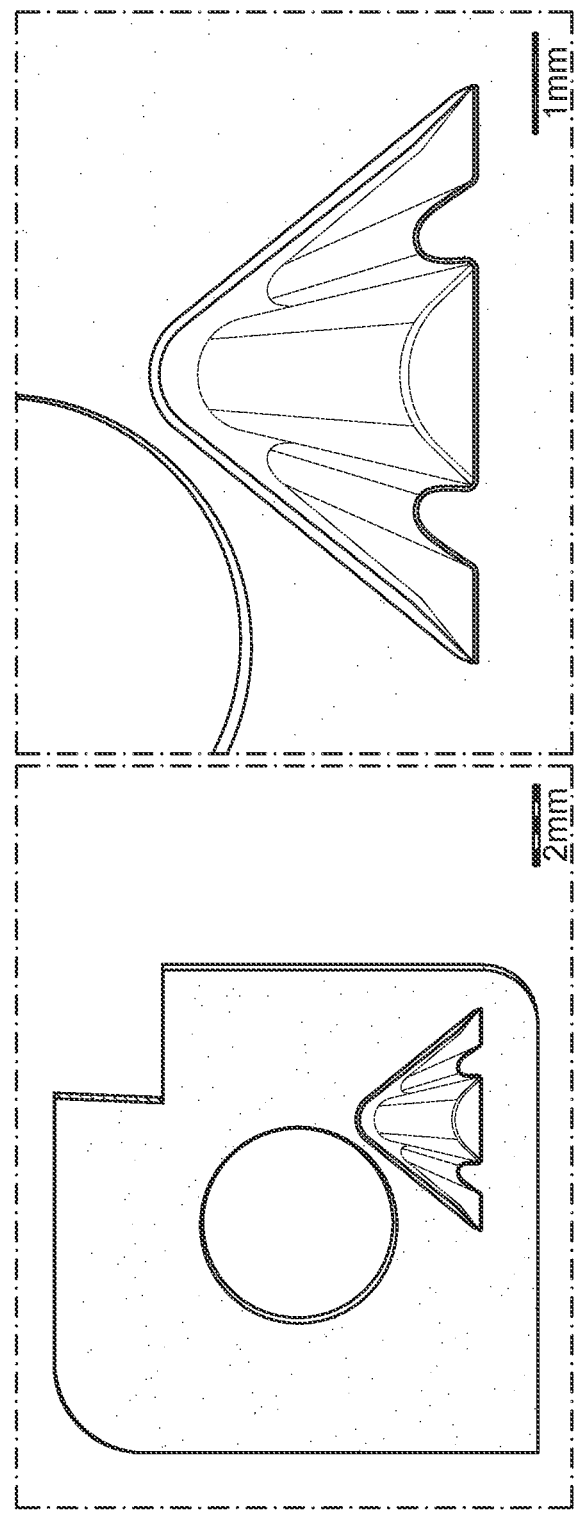
FIG. 9 is an optical image of a PCD cutting tool including a chip breaker on the rake surface according to one embodiment described herein.

Laser machining of the rake face yielded the chip breaker structure illustrated in FIG. 9. Radiation ablation regions defining at least one of surface microstructures and surface nanostructures were located on sidewall and bottom wall surfaces of the chip breaker. Similar to Example 1, the surface microstructures and surface nanostructures did not occlude surface pore structure of the PCD.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of making a cutting tool comprising:
providing a cutting insert comprising a rake face and body formed of a refractory material; and
cutting through the rake face and body with a laser beam to provide a flank face forming a cutting edge with the rake face, the flank face comprising radiation ablation regions defining at least one of surface microstructures and surface nanostructures, wherein
pore structure of the refractory material is not occluded by the surface microstructures and surface nanostructures, and wherein
the laser beam is rotated during cutting.

2. The method of claim 1, wherein the surface microstructures and surface nanostructures are nodules.

3. The method of claim 1, wherein the surface microstructures and surface nanostructures are ridges.

4. The method of claim 1, wherein the refractory material is polycrystalline diamond.

5. The method of claim 1, wherein the refractory material is selected from the group consisting of cemented carbide, single crystal diamond, CVD diamond, polycrystalline cubic boron nitride and polycrystalline ceramics.

6. The method of claim 1, wherein the flank face has a surface roughness (Ra) of 0.025 μm to 0.7 μm.

7. The method of claim 1 further comprising processing the cutting edge with the laser beam to provide radiation ablation regions on the rake face.

8. A method of making a cutting tool comprising:
providing a cutting insert comprising a rake face and body formed of a refractory material; and
cutting through the rake face and body with a laser beam to provide a flank face forming a cutting edge with the rake face, the flank face comprising radiation ablation regions defining at least one of surface microstructures and surface nanostructures, wherein
pore structure of the refractory material is not occluded by the surface microstructures and surface nanostructures, and wherein
the surface microstructures and surface nanostructures have substantially uniform spacing within an ablation region.

9. A method of making a cutting tool comprising:
providing a cutting insert comprising a rake face and body formed of a refractory material; and
cutting through the rake face and body with a laser beam to provide a flank face forming a cutting edge with the rake face, the flank face comprising radiation ablation regions defining at least one of surface microstructures and surface nanostructures, wherein
pore structure of the refractory material is not occluded by the surface microstructures and surface nanostructures, and wherein
the rake face is free of one or more radiation ablation regions at a distance of at least 1 μm from the cutting edge.

10. A method of making a cutting tool comprising:
providing a cutting insert comprising a rake face and body formed of a refractory material; and
cutting through the rake face and body with a laser beam to provide a flank face forming a cutting edge with the rake face, the flank face comprising radiation ablation regions defining at least one of surface microstructures and surface nanostructures, wherein
pore structure of the refractory material is not occluded by the surface microstructures and surface nanostructures, wherein the refractory material is graphite.

11. A method of making a cutting tool comprising:
providing a cutting insert comprising a rake face and body formed of a refractory material; and
cutting through the rake face and body with a laser beam to provide a flank face forming a cutting edge with the rake face, the flank face comprising radiation ablation regions defining at least one of surface microstructures and surface nanostructures, wherein the refractory material comprises a $sp^3$ hybridized fraction and a $sp^2$ hybridized fraction.

* * * * *